(12) United States Patent
Shinohara et al.

(10) Patent No.: US 11,888,359 B2
(45) Date of Patent: Jan. 30, 2024

(54) MOTOR-DRIVEN COMPRESSOR

(71) Applicant: KABUSHIKI KAISHA TOYOTA JIDOSHOKKI, Kariya (JP)

(72) Inventors: Koki Shinohara, Kariya (JP); Junya Yano, Kariya (JP); Yusuke Kinoshita, Kariya (JP); Kenji Momma, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 130 days.

(21) Appl. No.: 17/705,859

(22) Filed: Mar. 28, 2022

(65) Prior Publication Data
US 2022/0320973 A1 Oct. 6, 2022

(30) Foreign Application Priority Data

Mar. 30, 2021 (JP) ................ 2021-057403

(51) Int. Cl.
*H02K 11/33* (2016.01)
*H02K 9/22* (2006.01)
*H02K 11/30* (2016.01)
*H02M 7/00* (2006.01)
*F25B 31/02* (2006.01)
(Continued)

(52) U.S. Cl.
CPC .............. *H02K 11/33* (2016.01); *H02K 9/22* (2013.01); *H02K 9/227* (2021.01); *H02K 11/30* (2016.01); *B60H 1/3205* (2013.01); *F25B 31/02* (2013.01); *F25B 49/025* (2013.01); *F25B 2600/021* (2013.01); *H02K 2211/03* (2013.01); *H02M 7/003* (2013.01)

(58) Field of Classification Search
CPC ......... F04B 49/06; F04B 35/04; H02M 7/003; H02M 1/327; H02M 7/5387; F25B 49/025; F25B 31/02; F25B 2600/021; H02K 11/33; H02K 11/30; H02K 9/223; H02K 9/227; H02K 2211/03; H02K 11/38; H02K 9/00; H02K 9/22; B60H 1/3205
USPC ................................. 310/64, 68 R
See application file for complete search history.

(56) References Cited

U.S. PATENT DOCUMENTS 11,585,332 B2 * 2/2023 Hattori ................ F04B 35/04
2004/0013544 A1 * 1/2004 Kimura ............... F04C 23/008
417/410.5

(Continued)

FOREIGN PATENT DOCUMENTS

JP 2001-160696 A 6/2001
JP 2012-227344 A 11/2012
JP 2013-026320 A 2/2013

*Primary Examiner* — Alexander A Singh
(74) *Attorney, Agent, or Firm* — Sughrue Mion, PLLC

(57) ABSTRACT

A motor-driven compressor includes a compression portion, an electric motor, an inverter, and a metal housing. The inverter includes three-phase switching elements and a plastic holder that retains the three-phase switching elements. The housing includes a thermal radiation surface. The holder includes a metal spring. The holder is fixed to the housing using two fasteners. The three-phase switching elements are laid out between the two fasteners. The switching elements at opposite ends of the three-phase switching elements are pressed toward the thermal radiation surface by only the holder. The switching element at the middle of the three-phase switching elements is pressed toward the thermal radiation surface by the holder and the spring.

8 Claims, 5 Drawing Sheets

(51) Int. Cl.
*B60H 1/32* (2006.01)
*F25B 49/02* (2006.01)

(56) References Cited

U.S. PATENT DOCUMENTS

| | | |
|---|---|---|
| 2013/0021753 A1 | 1/2013 | Enami et al. |
| 2020/0313504 A1* | 10/2020 | Okochi ............... F04C 29/0085 |

\* cited by examiner

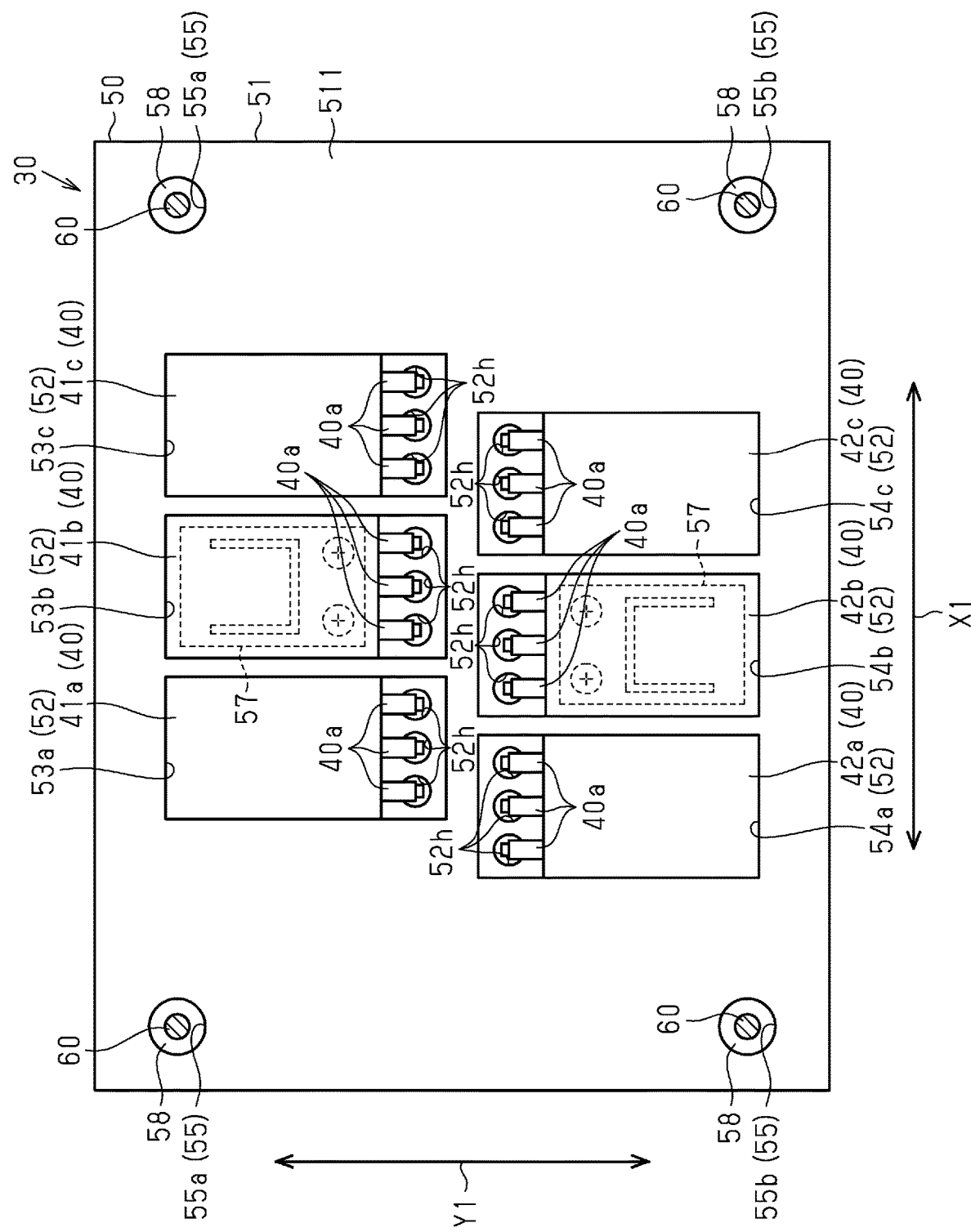

MOTOR-DRIVEN COMPRESSOR

BACKGROUND

1. Field

The present disclosure relates to a motor-driven compressor.

2. Description of Related Art

Motor-driven compressors include a compression portion that compresses a fluid, an electric motor that drives the compression portion, an inverter that drives the electric motor, and a metal housing that accommodates the inverter. The inverter includes three-phase switching elements that perform switching operation. In some cases, the inverter includes a plastic holder that holds the three-phase switching elements. The holder is fixed to the housing.

Japanese Laid-Open Patent Publication No. 2013-26320 discloses an example of a motor-driven compressor including a holder that has a metal spring. When the spring presses the switching elements toward a thermal radiation surface of the housing, the heat produced from the switching elements is efficiently radiated on the thermal radiation surface.

When, for example, one spring presses all the switching elements toward the thermal radiation surface, the switching elements may potentially be short-circuited by the spring. Likewise, in a case where one spring is arranged for each switching element and the switching elements are relatively close to each other, the switching elements may potentially be short-circuited by the spring. However, if a spring is not disposed, the switching elements cannot be pressed toward the thermal radiation surface of the housing and thus the heat produced from the switching elements cannot be efficiently radiated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A motor-driven compressor according to an aspect of the present disclosure includes a compression portion configured to compress a fluid, an electric motor configured to drive the compression portion, an inverter configured to drive the electric motor, and a metal housing that accommodates the inverter. The inverter includes three-phase switching elements configured to perform switching operation and a plastic holder that retains the three-phase switching elements. The housing includes a thermal radiation surface thermally coupled to the three-phase switching elements. The holder includes a metal spring that presses the switching element at a middle of the three-phase switching elements toward the thermal radiation surface. The holder is fixed to the housing using at least two fasteners. The three-phase switching elements are laid out between the two fasteners. The switching elements at opposite ends of the three-phase switching elements are pressed toward the thermal radiation surface by only the holder. The switching element at the middle of the three-phase switching elements is pressed toward the thermal radiation surface by the holder and the spring.

Other features and aspects will be apparent from the following detailed description, the drawings, and the claims.

BRIEF DESCRIPTION OF THE DRAWINGS

FIG. 5 is a cross-sectional view showing a state in which the switching elements are held by the holder.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 10 according to an embodiment will now be described with reference to FIGS. 1 to 5. The motor-driven compressor 10 is employed in, for example, a vehicle air conditioner.

Entire Configuration of Motor-Driven Compressor 10

Figure 1:
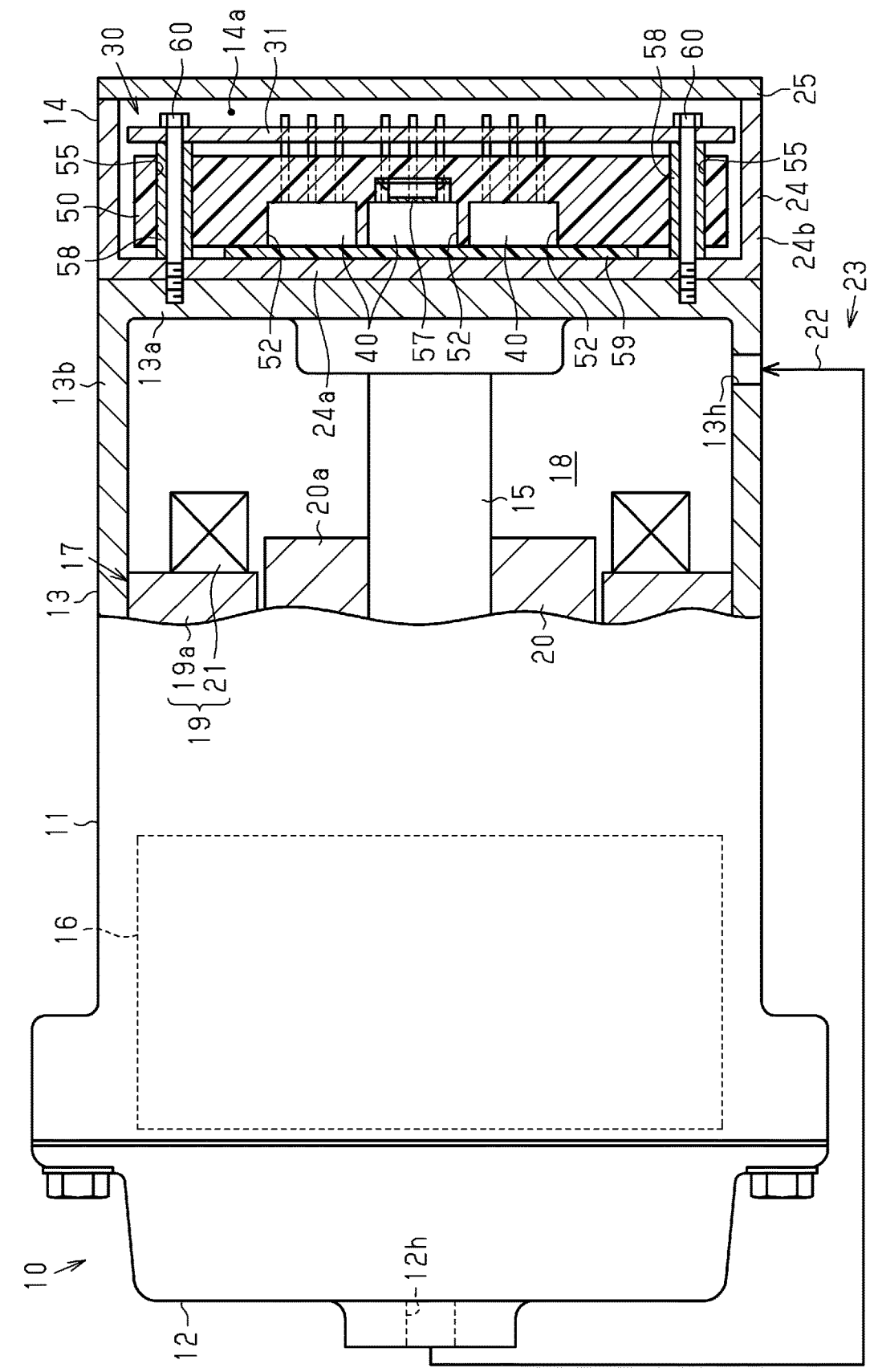
FIG. 1 is a cross-sectional side view of a motor-driven compressor according to an embodiment, with a part cut away.

As shown in FIG. 1, the motor-driven compressor 10 includes a housing 11. The housing 11 includes a discharge housing member 12, a motor housing member 13, and an inverter case 14. The discharge housing member 12, the motor housing member 13, and the inverter case 14 are made of metal (e.g., aluminum). Thus, the housing 11 is made of metal. The discharge housing member 12 is tubular. The motor housing member 13 is coupled to the discharge housing member 12. The motor housing member 13 includes a flat end wall 13a and a tubular peripheral wall 13b extending from an outer portion of the end wall 13a.

The motor housing member 13 accommodates a rotary shaft 15. The motor housing member 13 includes a compression portion 16 and an electric motor 17. The compression portion 16 is driven by rotation of the rotary shaft 15 so as to compress a refrigerant (fluid). The electric motor 17 rotates the rotary shaft 15 so as to drive the compression portion 16. The compression portion 16 and the electric motor 17 are laid out in an axial direction in which the rotational axis of the rotary shaft 15 extends. The electric motor 17 is closer to the end wall 13a than the compression portion 16. A motor chamber 18 that accommodates the electric motor 17 is defined between the compression portion 16 and the end wall 13a in the motor housing member 13.

The compression portion 16 may be, for example, a scroll-type compressor. The compression portion 16 may include a fixed scroll (not shown) fixed in the motor housing member 13 and a movable scroll (not shown) opposed to the fixed scroll.

The electric motor 17 includes a tubular stator 19 and a rotor 20 arranged inside the stator 19. The rotor 20 rotates integrally with the rotary shaft 15. The stator 19 surrounds the rotor 20. The rotor 20 includes a rotor core 20a secured to the rotary shaft 15 and permanent magnets (not shown) arranged on the rotor core 20a. The stator 19 includes a tubular stator core 19a and a motor coil 21 wound around the stator core 19a.

The peripheral wall 13b includes a suction port 13h. The suction port 13h opens at a position of the peripheral wall 13b that is relatively close to the end wall 13a. The suction port 13h is connected to the motor chamber 18. A first end of an external refrigerant circuit 22 is connected to the suction port 13h. The discharge housing member 12 includes a discharge port 12h. A second end of the external refrigerant circuit 22 is connected to the discharge port 12h.

When the compression portion 16 is driven, the compression portion 16 compresses the refrigerant that has been drawn into the motor chamber 18 through the suction port 13h from the external refrigerant circuit 22. Then, the refrigerant is discharged to the external refrigerant circuit 22 through the discharge port 12h. The refrigerant that has flowed to the external refrigerant circuit 22 flows through a heat exchanger and an expansion valve of the external refrigerant circuit 22 and flows back to the motor chamber 18 through the suction port 13h. The motor-driven compressor 10 and the external refrigerant circuit 22 are included in a vehicle air conditioner 23.

The inverter case 14 is attached to the end wall 13a of the motor housing member 13. The inverter case 14 includes an inverter accommodation chamber 14a that accommodates an inverter 30. Thus, the housing 11 accommodates the inverter 30. The compression portion 16, the electric motor 17, and the inverter 30 are laid out in this order in the axial direction of the rotary shaft 15.

Figure 2:
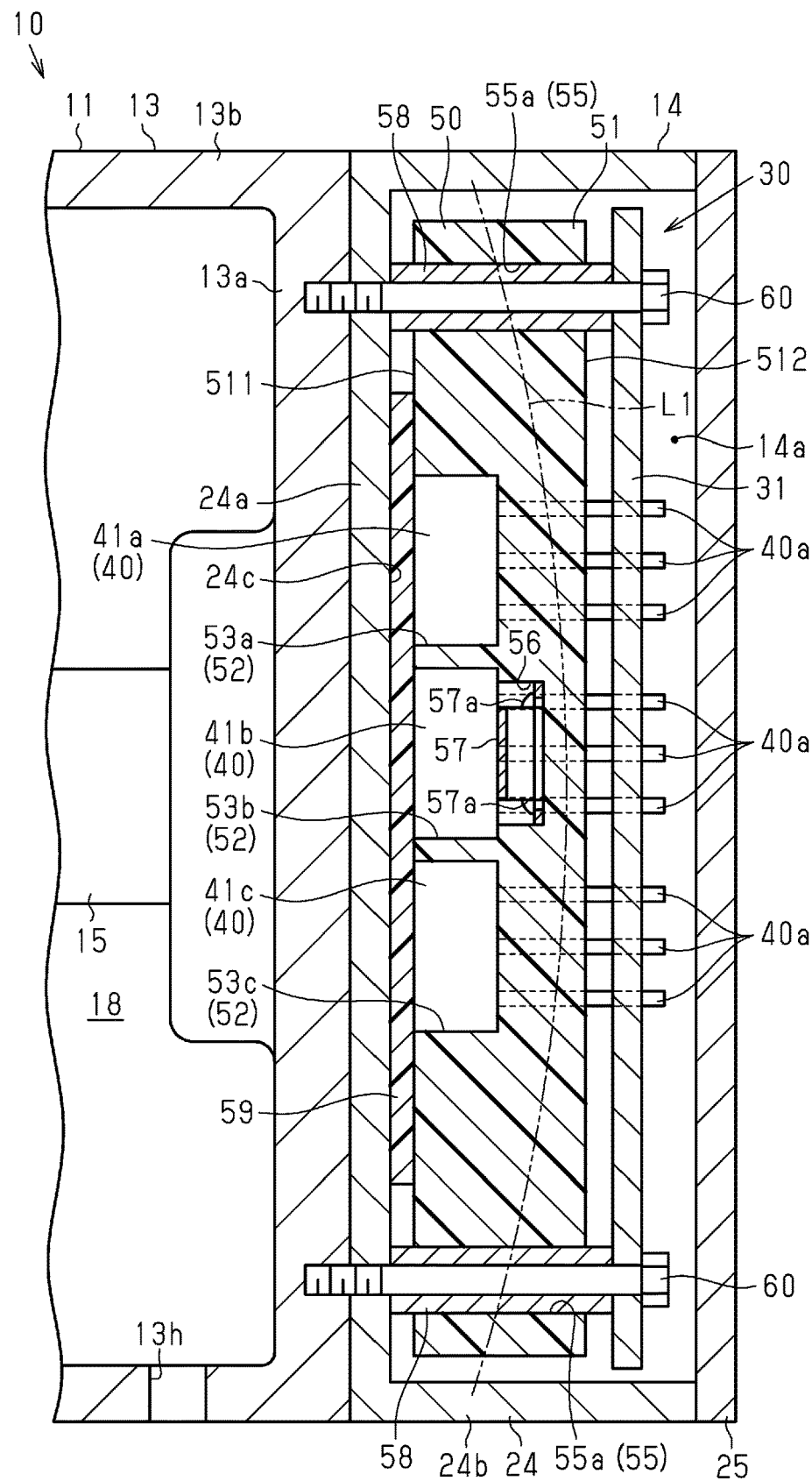
FIG. 2 is an enlarged cross-sectional view of a portion of the motor-driven compressor shown in FIG. 1.
Figure 3:
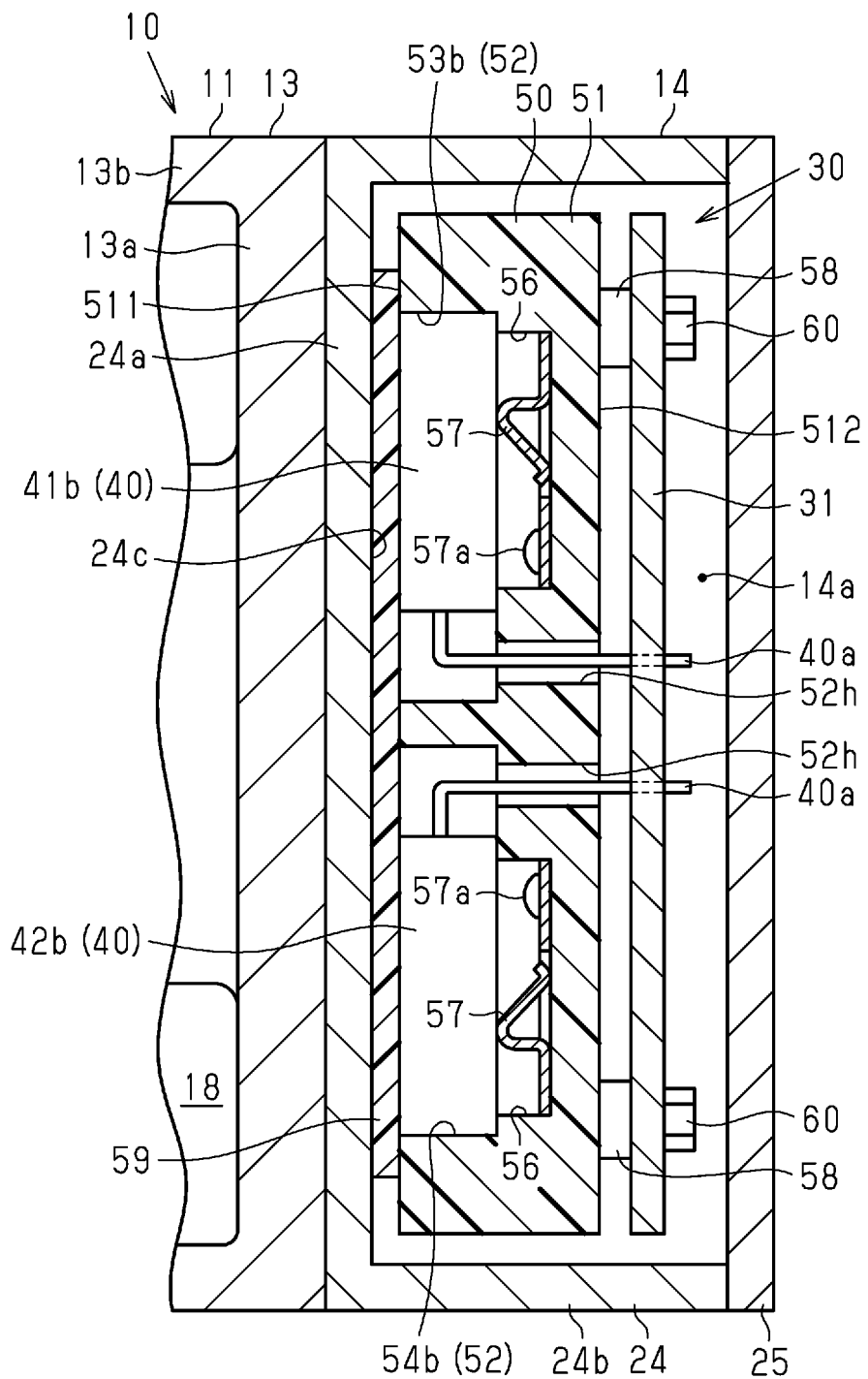
FIG. 3 is an enlarged cross-sectional view of a portion of the motor-driven compressor shown in FIG. 1.

As shown in FIGS. 2 and 3, the inverter case 14 includes a case body 24 and a lid 25. The case body 24 includes a plate-shaped case end wall 24a and a tubular case peripheral wall 24b that extends from an outer portion of the case end wall 24a. The lid 25 is plate-shaped. The lid 25 is coupled to the case body 24, with the lid 25 closing the opening of the case peripheral wall 24b. The inverter accommodation chamber 14a is defined by the case body 24 and the lid 25.

Configuration of Inverter 30

The inverter 30 drives the electric motor 17. The inverter 30 includes a circuit board 31. The circuit board 31 is accommodated in the inverter accommodation chamber 14a. The inverter 30 includes three-phase switching elements 40. The three-phase switching elements 40 are mounted on the circuit board 31. The switching elements 40 perform switching operation to drive the electric motor 17. Switching elements 40 included in upper arms of u-, v-, w-phases and switching elements 40 included in lower arms of u-, v-, w-phases are mounted on the circuit board 31. Accordingly, six switching elements 40 are mounted on the circuit board 31.

The inverter 30 includes a plastic holder 50. The holder 50 retains the three-phase switching elements 40. The holder 50 is accommodated in the inverter accommodation chamber 14a. Thus, the holder 50 is accommodated in the housing 11. The holder 50 also retains a capacitor (not shown) and a coil (not shown). The capacitor is a filter element that reduces noise contained in an input current from outside. The capacitor and the coil are included in a filter circuit.

Configuration of Holder 50

The holder 50 includes a plate-shaped holder body 51. The holder body 51 is substantially quadrilateral (e.g., rectangular) in plan view. The holder body 51 includes retaining recesses 52, each accommodating the corresponding the switching element 40. The holder body 51 includes, for example, six retaining recesses 52. The retaining recesses 52 open in a first surface 511 of the holder body 51 in a thickness direction of the holder body 51.

Lead insertion holes 52h open in the bottom surface of each retaining recess 52. The lead insertion holes 52h extend through the holder body 51 in the thickness direction and open in a second surface 512 of the holder body 51 in the thickness direction.

Figure 4:
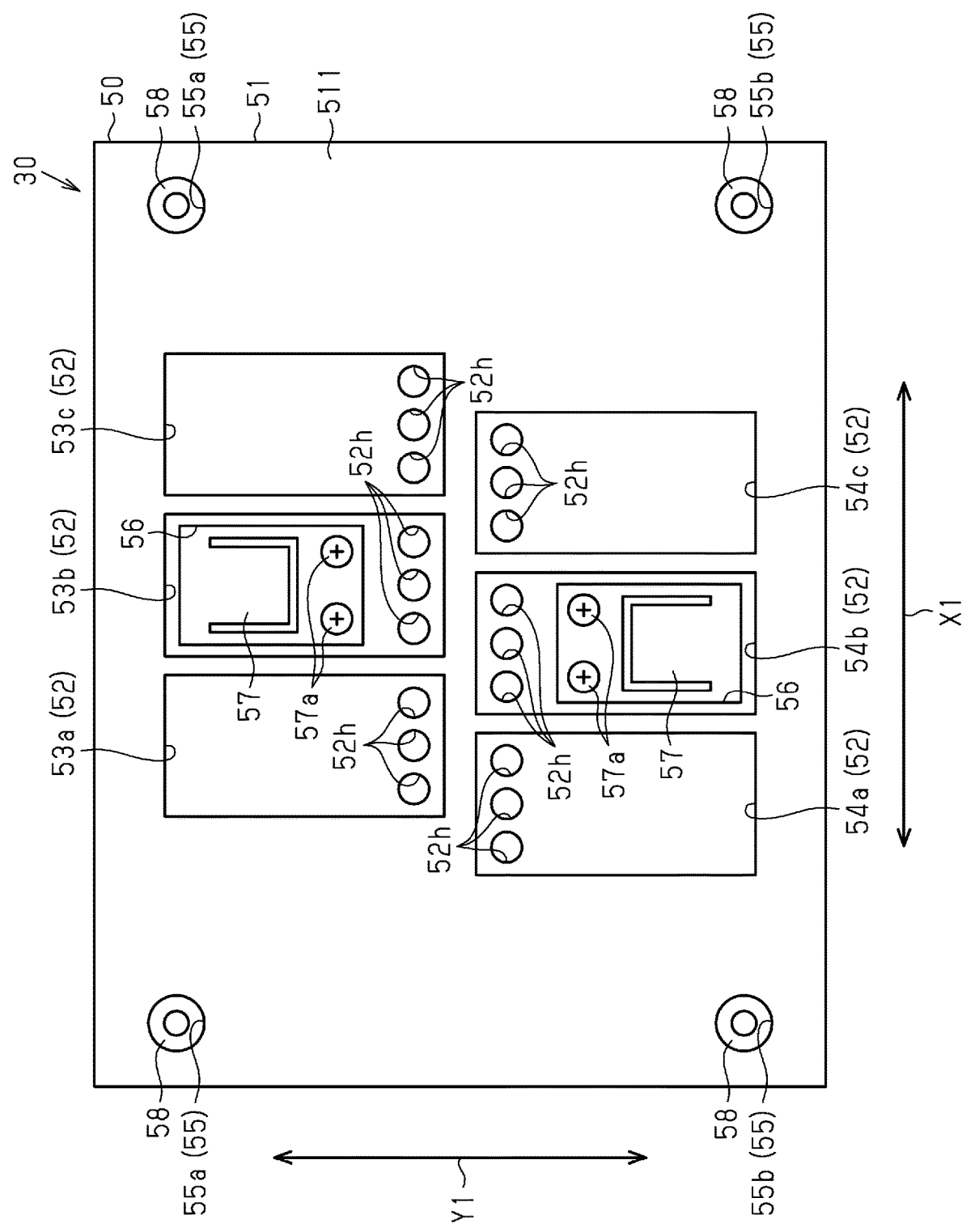
FIG. 4 is a plan view of the holder and the springs.

As shown in FIGS. 4 and 5, in plan view of the first surface 511 of the holder body 51, the direction that is orthogonal to the thickness direction of the holder body 51 is referred to as the first direction X1. Further, in plan view of the first surface 511, the direction that is orthogonal to the thickness direction of the holder body 51 and orthogonal to the first direction X1 is referred to as the second direction Y1.

Three of the six retaining recesses 52 are laid out in the first direction X1 at positions that are closer to a first end of the first surface 511 in the second direction Y1. The remaining three retaining recesses 52 are laid out in the first direction X1 at positions that are closer to a second end of the first surface 511 in the second direction Y1.

The three retaining recesses 52 at the positions closer to the first end in the second direction Y1 are also referred to as the first retaining recess 53a, the second retaining recess 53b, and the third retaining recess 53c. The first retaining recess 53a, the second retaining recess 53b, and the third retaining recess 53c are laid out in this order in the first direction X1. Thus, the second retaining recess 53b is the retaining recess 52 at the middle of the first retaining recess 53a, the second retaining recess 53b, and the third retaining recess 53c in the first direction X1.

The three retaining recesses 52 at the positions closer to the second end in the second direction Y1 are also referred to as the first retaining recess 54a, the second retaining recess 54b, and the third retaining recess 54c. The first retaining recess 54a, the second retaining recess 54b, and the third retaining recess 54c are laid out in this order in the first direction X1. Thus, the second retaining recess 54b is the retaining recess 52 at the middle of the first retaining recess 54a, the second retaining recess 54b, and the third retaining recess 54c in the first direction X1.

A bolt insertion hole 55 opens at each of four corners of the holder body 51. Two of the four bolt insertion holes 55 are located closer to the first end in the second direction Y1 on the opposite sides of the retaining recesses 53a, 53b, 53c in the first direction X1. The remaining two bolt insertion holes 55 are located closer to the second end in the second direction Y1 on the opposite sides of the retaining recesses 54a, 54b, 54c in the first direction X1.

The two bolt insertion holes 55 on the opposite sides of the retaining recesses 53a, 53b, 53c in the first direction X1 are also referred to a pair of bolt insertion holes 55a. The two bolt insertion holes 55 on the opposite sides of the retaining recesses 54a, 54b, 54c in the first direction X1 are also referred to a pair of bolt insertion holes 55b. The pair of bolt insertion holes 55a are laid out, for example, along a first long side of the holder body 51. The pair of bolt insertion holes 55b are laid out, for example, along a second long side of the holder body 51.

Of the retaining recesses 53a, 53b, 53c, the second retaining recess 53b has the smallest difference in the distance to each one of the two bolt insertion holes 55a. Of the first retaining recess 54a, the second retaining recess 54b, and the third retaining recess 54c, the second retaining recess 54b has the smallest difference in the distance to each one of the two bolt insertion holes 55b.

A spring accommodation recess 56 opens in the bottom surface of each of the second retaining recesses 53b and 54b. Each spring accommodation recess 56 accommodates a metal spring 57. Thus, the holder 50 includes the springs 57. Each spring 57 is, for example, a leaf spring. Each spring 57 is attached to the bottom surface of the corresponding accommodation recess 56 by bolts 57a.

Switching Elements 40

As shown in FIGS. 2 and 3, each retaining recess 52 retains the corresponding switching element 40. Each switching element 40 includes leads 40a. Each retaining recess 52 retains the corresponding switching element 40 with the leads 40a respectively inserted through the lead insertion holes 52h, which open in the retaining recess 52. The tip of each lead 40a is electrically connected to the circuit board 31. The tip of each lead 40a is, for example, soldered to the circuit board 31.

As shown in FIG. 5, the three switching elements 40 respectively retained by the first retaining recess 53a, the second retaining recess 53b, and the third retaining recess 53c are hereinafter also referred to as the first switching element 41a, the second switching element 41b, and the third switching element 41c. The switching elements 41a, 41b, 41c are included in the upper arms. Likewise, the three switching elements 40 respectively retained by the first retaining recess 54a, the second retaining recess 54b, and the third retaining recess 54c are hereinafter also referred to as the first switching element 42a, the second switching element 42b, and the third switching element 42c. The switching elements 42a, 42b, 42c are included in the lower arms. The three switching elements 40 included in the upper arms are hereinafter also referred to as the three-phase switching elements 40. Likewise, the three switching elements 40 included in the lower arms are also referred to as the three-phase switching elements 40. The second switching elements 41b, 42b are each in contact with the corresponding spring 57 and are respectively retained by the second retaining recesses 53b, 54b.

As shown in FIG. 2, a tubular collar 58 is press-fitted to each bolt insertion hole 55. Each collar 58 includes a first end face and a second end face in the axial direction. The first end face protrudes from the first surface 511 of the holder body 51. The second end face protrudes from the second surface 512 of the holder body 51. A bolt 60 (fastener) is insertable into each collar 58.

The holder 50 is arranged on the case end wall 24a, with each collar 58 in contact with the inner surface of the case end wall 24a. The bolts 60 extend through the circuit board 31 and pass through the collars 58 so that the bolts 60 are extended through the case end wall 24a and screwed into the end wall 13a. Thus, the holder 50, the circuit board 31, and the case body 24 are unitized and attached to the end wall 13a. Accordingly, the holder 50 is fixed to the housing 11 using at least two bolts 60 (e.g., four bolts 60).

Each switching element 40 is thermally coupled to the inner surface of the case end wall 24a with an insulating sheet 59 in between. Thus, the inner surface of the case end wall 24a is a thermal radiation surface 24c that is thermally coupled to the three-phase switching elements 40. Accordingly, the housing 11 includes the thermal radiation surface 24c, which is thermally coupled to the three-phase switching elements 40. As shown in FIG. 3, the second switching elements 41b, 42b respectively retained by the second retaining recesses 53b, 54b are held between the springs 57 and the insulating sheet 59. Each spring 57 is located away from the housing 11 and arranged in the holder 50.

As shown in FIG. 5, the switching elements 41a, 41b, 41c are located between the two bolts 60 that respectively pass through the two bolt insertion holes 55. The second switching element 41b is located at the middle of the three-phase switching elements 40 included in the upper arms. The second switching element 41b at the middle of the switching elements 41a, 41b, 41c is relatively far from the two bolts 60.

The first switching element 41a and the third switching element 41c are located at the opposite ends of the three-phase switching elements 40 included in the upper arms. Thus, the first switching element 41a is closer to one (first bolt 60) of the two bolts 60 than the second switching element 41b. Further, the third switching element 41c is closer to the other one (second bolt 60) of the two bolts 60 than the second switching element 41b.

The switching elements 42a, 42b, 42c are located between the two bolts 60 that respectively pass through the two bolt insertion holes 55. The second switching element 42b is located at the middle of the three-phase switching elements 40 included in the lower arms. The second switching element 42b at the middle of the switching elements 42a, 42b, 42c is relatively far from the two bolts 60.

The first switching element 42a and the third switching element 42c are located at the opposite ends of the three-phase switching elements 40 included in the lower arms. Thus, the first switching element 42a is closer to one (first bolt 60) of the two bolts 60 than the second switching element 42b. Further, the third switching element 42c is closer to the other one (second bolt 60) of the two bolts 60 than the second switching element 42b.

The second switching elements 41b, 42b are each pressed toward the thermal radiation surface 24c by the corresponding spring 57. Thus, the springs 57 press the switching element 40 toward the thermal radiation surface 24c. Further, the first switching elements 41a, 42a and the third switching elements 41c, 42c are pressed toward the thermal radiation surface 24c by only the holder 50.

Operation

The operation of the present embodiment will now be described.

The direct-current voltage from an external power supply is converted into alternating-current voltage through switching operation of each switching element 40. The converted alternating-current voltage is supplied to the electric motor 17 as drive voltage. This drives the electric motor 17 so as to rotate the rotary shaft 15, thereby driving the compression portion 16. As a result, the compression portion 16 compresses a refrigerant.

As shown by the broken line L1 in FIG. 2, fastening forces of the bolts 60 that fix the holder 50 to the end wall 13a of the motor housing member 13 cause the holder 50 to warp such that the surroundings of the bolts 60 in the holder body 51 become closer to the end wall 13a of the motor housing member 13. Thus, the first switching elements 41a, 42a and the third switching elements 41c, 42c on the opposite ends of the three-phase switching elements 40 are pressed toward the thermal radiation surface 24c by the holder 50 with the fastening forces of the bolts 60. Accordingly, the first switching elements 41a, 42a and the third switching elements 41c, 42c are pressed toward the thermal radiation surface 24c by only the holder 50. This allows the heat produced from the first switching elements 41a, 42a and the third switching elements 41c, 42c to be efficiently radiated on the thermal radiation surface 24c.

The second switching elements 41b, 42b at the middle of the three-phase switching elements 40 are not easily pressed toward the thermal radiation surface 24c by the holder 50 with the fastening forces of the bolts 60 that fix the holder 50 to the end wall 13a of the motor housing member 13. Thus, the second switching elements 41b, 42b are pressed toward the thermal radiation surface 24c by the springs 57. Accordingly, the second switching elements 41b, 42b, which are not easily pressed toward the thermal radiation surface 24c by the holder 50 with the fastening forces of the bolts 60 that fix the holder 50 to the end wall 13a, are pressed toward the thermal radiation surface 24c by the springs 57. Therefore, the second switching elements 41b, 42b at the middle of the three-phase switching elements 40 are pressed toward the thermal radiation surface 24c by the holder 50 and the springs 57. This allows the heat produced from the second switching elements 41b, 42b to be efficiently radiated on the thermal radiation surface 24c.

ADVANTAGES

The above-described embodiment provides the following advantages.

(1) The switching elements 40 at the opposite ends of the three-phase switching elements 40 are pressed toward the thermal radiation surface 24c by only the holder 50. The switching element 40 at the middle of the three-phase switching elements 40 is pressed toward the thermal radiation surface 24c by the holder 50 and the springs 57.

The switching elements 40 at the opposite ends of the three-phase switching elements 40 are each relatively close to one of the two bolts 60. Thus, even if not pressed by the springs 57 toward the thermal radiation surface 24c, the switching elements 40 at the opposite ends of the three-phase switching elements 40 are easily pressed toward the thermal radiation surface 24c by the holder 50 with the fastening force of the bolts 60. Accordingly, the switching elements 40 at the opposite ends of the three-phase switching elements 40 are pressed toward the thermal radiation surface 24c by only the holder 50. This allows the heat produced from the switching elements 40 at the opposite ends to be efficiently radiated on the thermal radiation surface 24c.

In contrast, the switching element 40 at the middle of the three-phase switching elements 40 is relatively far from the two bolts 60. Thus, the second switching element 40 at the middle of the three-phase switching elements 40 is not easily pressed toward the thermal radiation surface 24c by the holder 50 with the fastening forces of the bolts 60 that fix the holder 50 to the motor housing member 13. Accordingly, only the second switching element 40 at the middle of the three-phase switching elements 40 is pressed toward the thermal radiation surface 24c by the spring 57. In this structure, the switching element 40 of the three-phase switching elements 40 that is not easily pressed toward the thermal radiation surface 24c is pressed toward the thermal radiation surface 24c by the spring 57. Therefore, the switching element 40 at the middle of the three-phase switching element 40 is pressed toward the thermal radiation surface 24c by the holder 50 and the spring 57. This allows the heat produced from the middle switching element 40 to be efficiently radiated on the thermal radiation surface 24c.

Accordingly, there is no need to press all the switching elements 40 toward the thermal radiation surface 24c using the spring 57. This avoids short-circuiting of the switching elements 40 through one spring 57 that would occur in a device with the spring 57 that presses all the switching element 40 toward the thermal radiation surface 24c. As a result, the heat produced from the switching elements 40 is efficiently radiated while ensuring the insulation of the switching elements 40.

(2) There is no need to arrange one spring 57 in every one of switching elements 40 in order to press all the switching elements 40 toward the thermal radiation surface 24c. This reduces the number of components.

Modifications

The above-described embodiment may be modified as follows. The above-described embodiments and the following modifications can be combined as long as the combined modifications remain technically consistent with each other.

The manner of laying out the switching elements 40 on the holder 50 is not particularly limited. In short, the spring 57 simply need to press the switching element 40 at the middle of the three-phase switching elements 40 toward the thermal radiation surface 24c.

The two fasteners used to fix the holder 50 to the housing 11 may be, for example, press-fit pins that are press-fitted to the housing 11. In short, the fasteners used to fix the holder 50 to the housing 11 are not limited to the bolts 60.

For example, a cover may be attached to the end wall 13a so that the end wall 13a and the cover define the inverter accommodation chamber 14a. In this case, the end face of the end wall 13a in contact with the inverter accommodation chamber 14a is used as a thermal radiation surface thermally coupled to the three-phase switching elements 40.

The inverter 30 may be located, for example, outward from the housing 11 in the radial direction of the rotary shaft 15. In short, the compression portion 16, the electric motor 17, and the inverter 30 do not have to be laid out in this order in the axial direction of the rotary shaft 15.

The compression portion 16 does not have to be of a scroll type and may be of, for example, a piston type or a vane type.

The motor-driven compressor 10 may be configured to be installed in, for example, a fuel cell electric vehicle and compress air (fluid) supplied to a fuel cell using the compression portion 16.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:
1. A motor-driven compressor, comprising:
   a compression portion configured to compress a fluid;

an electric motor configured to drive the compression portion;
an inverter configured to drive the electric motor; and
a metal housing that accommodates the inverter, wherein the inverter includes:
   three-phase switching elements configured to perform switching operation; and
   a plastic holder that retains the three-phase switching elements,
the metal housing includes a thermal radiation surface thermally coupled to the three-phase switching elements,
the plastic holder includes a metal spring that presses a switching element at a middle of the three-phase switching elements toward the thermal radiation surface,
the plastic holder is fixed to the metal housing using at least two fasteners,
the three-phase switching elements are laid out between the two fasteners,
switching elements at opposite ends of the three-phase switching elements are pressed toward the thermal radiation surface by only the plastic holder, and
the switching element at the middle of the three-phase switching elements is pressed toward the thermal radiation surface by the plastic holder and the metal spring.

2. The motor-driven compressor according to claim 1, wherein the three-phase switching elements are laid out in a line between the two fasteners in plan view of the plastic holder along an axis of the electric motor.

3. The motor-driven compressor according to claim 2, wherein
the plastic holder includes a plate-shaped holder body,
the plate-shaped holder body is quadrilateral in plan view along the axis,
the at least two fasteners include four fasteners, and
the four fasteners are arranged at four corners of the plate-shaped holder body, respectively.

4. The motor-driven compressor according to claim 3, wherein
the plate-shaped holder body is rectangular in plan view along the axis of the electric motor, and
the three-phase switching elements are laid out along a long side of the plate-shaped holder body between the two fasteners that are laid out along the long side.

5. The motor-driven compressor according to claim 4, wherein
the three-phase switching elements are included in an upper arm and laid out along a first long side of the plate-shaped holder body, and
the motor-driven compressor further comprises additional three-phase switching elements included in a lower arm, the additional three-phase switching elements being laid out along a second long side of the plate-shaped holder body.

6. The motor-driven compressor according to claim 1, wherein
the plastic holder includes three retaining recesses laid out between the two fasteners, and
each of the retaining recesses accommodates a corresponding one of the switching elements.

7. The motor-driven compressor according to claim 6, wherein
a spring accommodation recess opens in a bottom surface of a retaining recess at a middle of the three retaining recesses, and
the metal spring accommodation recess accommodates the spring.

8. The motor-driven compressor according to claim 1, wherein the fasteners are bolts or press-fit pins that extend along an axis of the electric motor.

* * * * *